United States Patent [19]

Asaeda et al.

[11] Patent Number: 4,639,850
[45] Date of Patent: Jan. 27, 1987

[54] POWER CONVERTER DEVICE

[75] Inventors: Takeaki Asaeda, Kobe; Toru Nakamura, Akashi; Takashi Yutani, Kobe, all of Japan

[73] Assignee: Mitsubishi Denki Kabushiki Kaisha, Japan

[21] Appl. No.: 650,370

[22] PCT Filed: Mar. 28, 1984

[86] PCT No.: PCT/JP84/00144
§ 371 Date: Sep. 20, 1984
§ 102(e) Date: Sep. 20, 1984

[87] PCT Pub. No.: WO84/04004
PCT Pub. Date: Oct. 11, 1984

[30] Foreign Application Priority Data
Mar. 29, 1983 [JP] Japan .................. 58-55596

[51] Int. Cl.4 ............................. H02H 7/122
[52] U.S. Cl. ........................ 363/58; 363/96; 363/136
[58] Field of Search ................ 363/55–58, 363/96–98, 135–138; 361/56, 88, 91; 307/252 C

[56] References Cited
U.S. PATENT DOCUMENTS 3,349,315 10/1967 Studtmann ............... 363/137 X
4,231,083 10/1980 Matsuda et al. .......... 363/57 X
4,276,588 6/1981 McLyman et al. ........... 363/56
4,336,587 6/1982 Boettcher, Jr. et al. ..... 363/134

FOREIGN PATENT DOCUMENTS 0063076 4/1983 Japan ...................... 363/58

OTHER PUBLICATIONS

"Application Techniques for High Power Gate Turn-Off Thyristors" by R. L. Steigerwald, IEEE IAS '75 Annual, pp. 165–174.

Primary Examiner—Peter S. Wong
Attorney, Agent, or Firm—Leydig, Voit & Mayer

[57] ABSTRACT

A power conversion device such as an inverter using as bridge arm elements self-extinguishing-type switching elements for converting D-C input power into A-C load power. Snubbers, each including a capacitor and a diode in series, are connected in parallel with the switching elements. A discharging circuit, having a diode is connected across the diodes of the snubbers, and a power source feedback circuit, including a current transformer, are employed to return the current discharged from the snubbers to the input power source, thereby enhancing conversion efficiency.

4 Claims, 6 Drawing Figures

POWER CONVERTER DEVICE

TECHNICAL FIELD

The present invention relates to a power converter device. More particularly, it relates to an inverter device adapted to be used as arm elements for self-extinguishing type switching elements.

A half bridge of a conventional inverter main circuit composed of connected self-extinguishing type switching elements is shown in FIG. 1. In FIG. 1, reference characters P, N respectively denote positive and negative electrodes of a D-C bus, and 1U, 1X denote gate turn-off thyristors (hereinafter simply referred to as GTO) as arm elements, which alternatively receive gate signals to be turned ON and OFF. Reference characters 2U, 2X denote reactors connected in series and inserted between the GIO 1U and the GTO 1X. Reference numerals 3U, 3X denote diodes, the diode 3U being connected in parallel with a series circuit of the GTO 1U and the reactors 2U, 2X, and the diode 3X being connected in parallel with a series circuit of the GTO 1X and the reactors 2U, 2X. Reference characters 4U, 4X respectively denote snubbers of the GTO 1U and GTO 1X. The snubber 4U includes a snubber capacitor 41u, a diode 42u and a resistor 43u, and is connected in parallel with the GTO 1U. The snubber 4X includes of a snubber capacitor 41x, a diode 42x is a resistor 43x and connected in parallel with the GTO 1X. Reference character U denotes an A-C output terminal drawn from the connection point of the reactors 2U, 2X.

Then, operation of the thus-constructed inverter circuit will be described below with reference to FIG. 2.

In FIG. 2, Tu denotes an ON period of the GTO 1U, Tx an ON period of the GTO 1X, Iw a load current flowing through a load (in this example, a delay load). Iu and Ix are, respectively, currents flowing through the GTO 1U and GTO 1X, whereas Iud and Ixd are, respectively, currents flowing through the diodes 3U, 3X. Vuc, Vxc are, respectively, voltages across the snubber capacitors 41u, 41x.

Assume now that the GTO 1U is ON immediately before a time t1 and a load current Iw is supplied to a load, not shown, through the reactor 2U and the A-C output terminal U. When the GTO 1U is turned OFF at a time t1, the current Iu of the GTO 1U flows to the snubber 4U. When the snubber capacitor 41u is charged, the diode 3X is turned ON, and a load current Iw is flowed therethrough. An ON gate signal is appled to the GTO 1X immediately after the time t1, charge stored in the snubber capacitor 41x is discharged through the resistor 43x. When the polarity of the load current Iw is inverted at at a time t2 after the discharge is finished, the diode 3X blocks the load current Iw, and the load current Iw starts flowing through the GTO 1X. Thus, A-C power is produced from the A-C output terminal U.

Thus, since the charge of the snubber capacitor is discharged through the resistor in the conventional one, it has a disadvantage that di/dt duty cycle of the GTO becomes high, and since the charging energy is consumed through the resistor, it has a disadvantage that the conversion efficiency is not preferable.

DISCLOSURE OF THE INVENTION

It is, therefore, an object of the present invention is to provide a power converter device including self-extinguishing-type switching elements (GTO) connected in series to form bridge arm elements for efficiently converting D-C input power into A-C load power. To accomplish this objective, a capacitor discharging circuit having a diode and connected across the diodes of the snubbers, and a power source feedback circuit including a current transformer, are employed to return the current discharged from the snubbers to the input power source. Accordingly, the di/dt duty cycle of the GTO is reduced as compared with the conventional one, and the conversion efficiency can be greatly enhanced.

BEST MODE OF CARRYING OUT THE INVENTION

Figure 1:
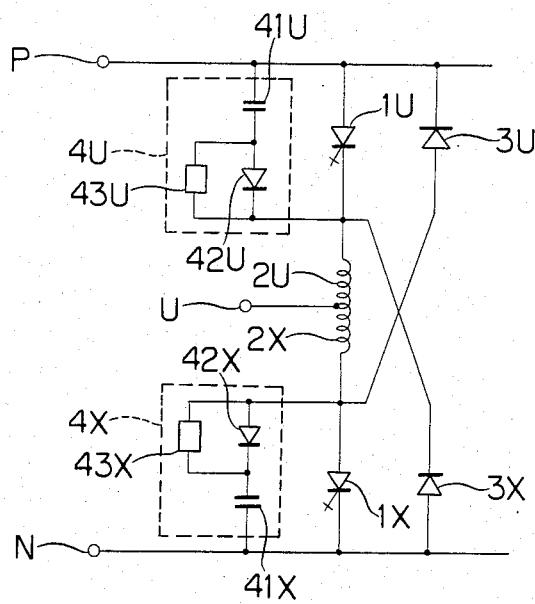
FIG. 1 is a circuit diagram of a half bridge of a conventional inverter.
Figure 2:
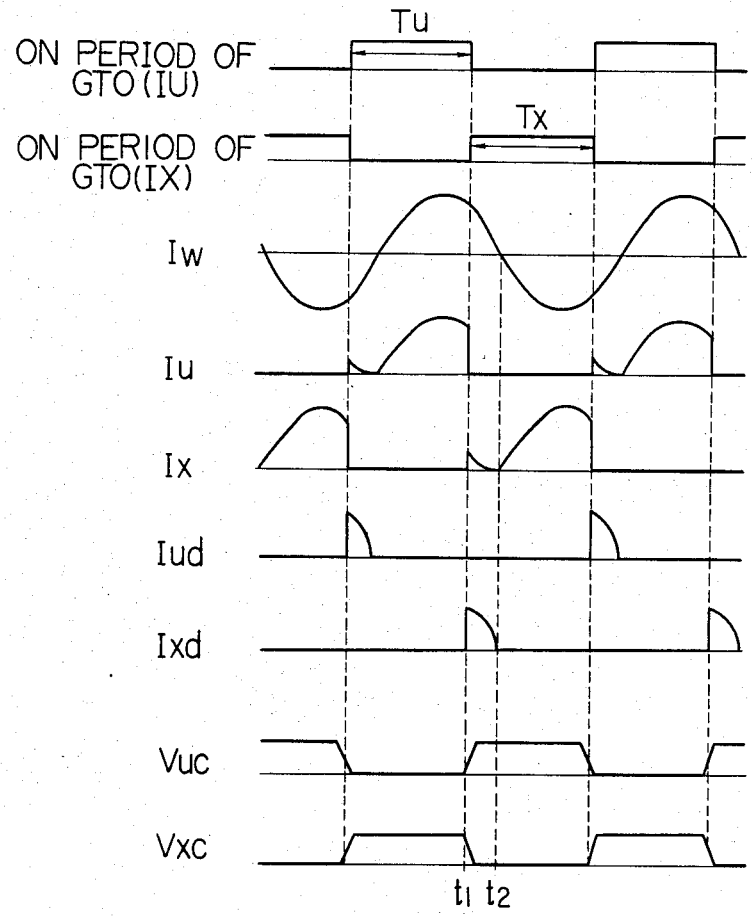
FIG. 2 is an operating waveform diagram of the inverter.
Figure 3:
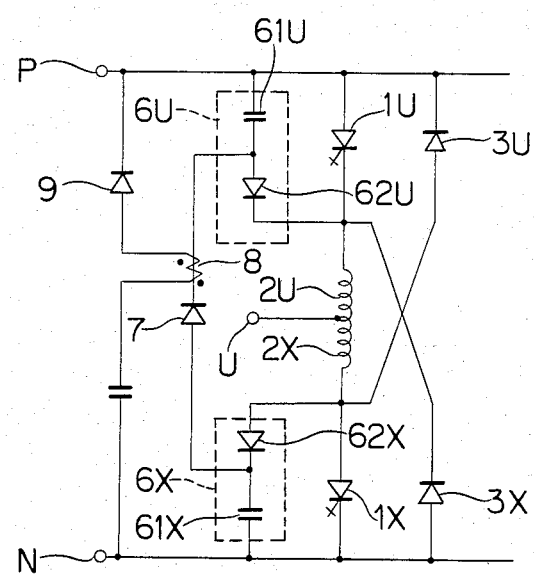
FIG. 3 is a circuit diagram of an embodiment of the inverter according to the present invention.

In FIG. 3, reference character 6U denotes a snubber which includes a snubber capacitor 61u and a diode 62u connected in series with the capacitor 61u and is connected in parallel with a GTO 1U. Reference character 61X denotes a snubber which includes a snubber capacitor 61x and a diode 62x connected in series with the capacitor 61x and is connected in parallel with a GTO 1X. The anode side of the diode 62u of the snubber 6U and the cathode side of the diode 62x of the snubber 6X are connected to form a diode circuit having a diode 7. Reference numeral 8 denotes a current transformer inserted in the diode circuit and connected, at one end, to a positive electrode P through a diode 9 and to a negative electrode N, at the other end to form a power source feedback circuit. The other construction are the same as that in FIG. 1 and accordingly denoted by the same reference numerals and characters as those in FIG. 1.

Figure 4:
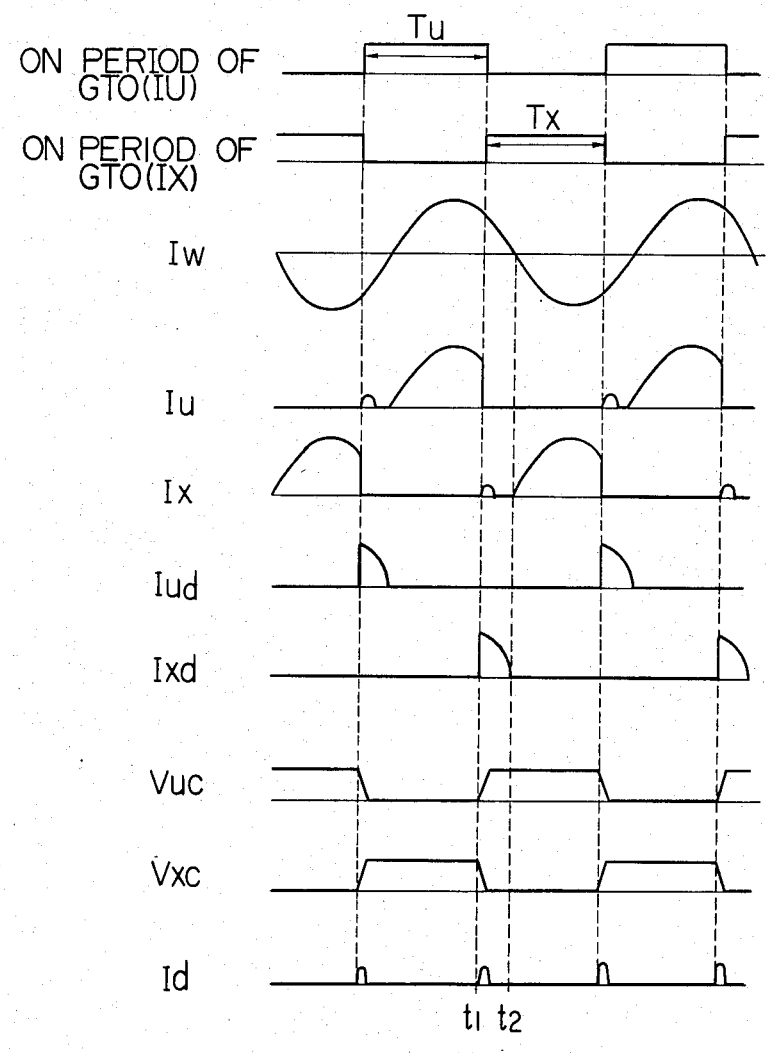
FIG. 4 is an operating waveform of each section of the embodiment.

The operation of this converter device will now be described with reference to FIG. 4. Note that in FIG. 4, Id denotes a current which flows through both the diode circuit and the power source feedback circuit.

When the GTO 1U, which has been ON so far is turned OFF at a time t1, a current flowing through the GTO 1U is transferred to the snubber 6U, and the snubber capacitor 61U is charged. Under this condition, the charge of the snubber capacitor 61x of the snubber 6X is discharged to a load through the diode 7—the current transformer 8—the diode 62u—the reactor 2U—the A-C output terminal U.

When the GTO 1X is turned ON immediately after the time t1, the charge of the snubber capacitor 61x is discharged through the diode circuit 7—the current transformer 8—the diode 62u—the reactor 2U—the reactor 2X—the GTO 1X. The load current Iw flows through the diode 3X—the reactor 2U—the output terminal U when the discharge of the snubber capacitor 61u is completed, but does not flow to the GTO 1X.

When the polarity is inverted at the time t2, it flows through the reactor GTO 1X GTO1X.

More particularly, when one of the GTO 1U and GTO 1X is turned ON, a discharging circuit including the reactors 2U, 2X of series circuit is closed, and a discharging current of the snubber capacitor flows through the discharging circuit. Thus, the di/dt duty cycle of the GTO is reduced. When the opponent GTO is turned OFF, the charge of the snubber capacitor flows to the load through one of diode circuit 7, the diode and the reactor of the snubber of the opponent GTO. Thus, in case there is a period that both become simultaneously OFF through an interval between the turning ON periods of the GTO 1U and the GTO 1X, power conversion efficiency becomes high. Since energy that is discharged from the discharging current flowing from the secondary side of the current transformer 8 through the diode 9 to the D-C power source side is returned to the D-C power source under the snubber capacitor discharging condition, the power conversion efficiency is further enhanced.

Figure 5:
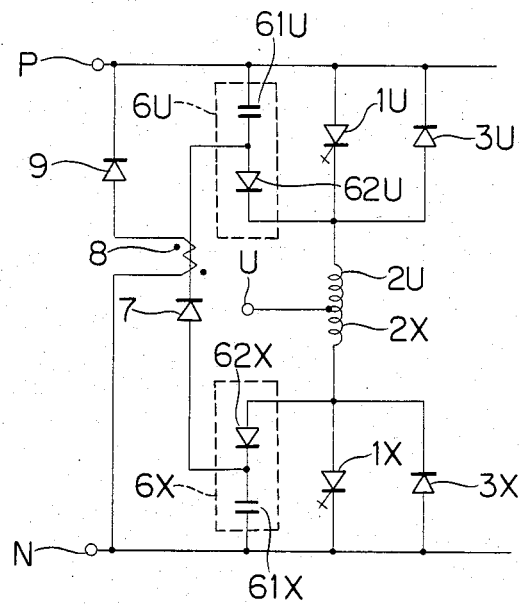
FIG. 5 is a circuit diagram of another embodiment of the present invention.
Figure 6:
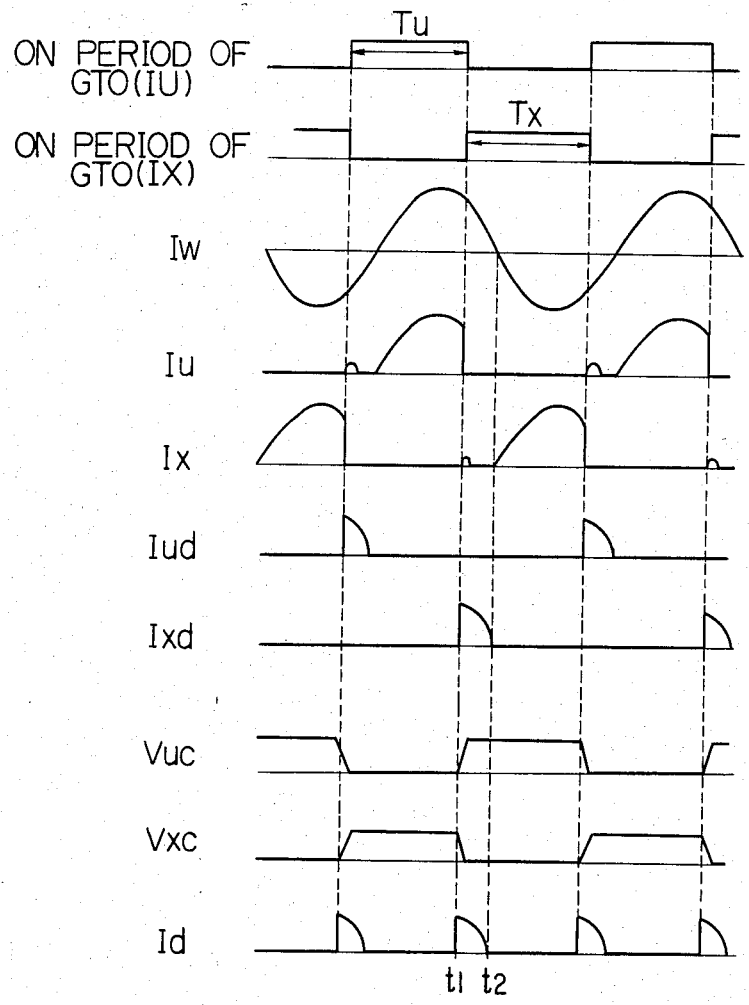
FIG. 6 is a waveform diagram of each section of the embodiment of FIG. 5.

FIG. 5 shows another embodiment of the present invention, which is different from the embodiment in FIG. 3 at the point that diodes 3U, 3X are respectively connected in anti-parallel to GTO 1U and GTO 1X. As shown in FIG. 6, when the GTO 1U is, for example, turned OFF even in this embodiment, the snubber capacitor 61u is charged, and the charge of the snubber capacitor 61x flows to a load, not shown, through the diode circuit 7, the diode 62u, and the reactor 2U. When the snubber capacitor completes charging and the snubber capacitor 61x completes discharging, the load current flows in a circuit of the diode 3X, the diode 62x, the diode circuit 7, the converter 8, the diode 62u, the reactor 2U and the output terminal U. When the polarity of the load current is inverted at a time t2, the load current flows through a circuit of the output terminal U, the reactor 2X and the GTO 1X.

Under the above-described operation, even if the GTO 1X is turned ON immediately after the time t1, the discharging current of the snubber capacitor 61x flows in a circuit of the diode circuit 7, the current transformer 8, the diode 62u, the reactors 2U, 2X and the GTO 1X. Thus, the di/dt duty cycle of the GTO 1X is reduced. If the gate signals of both the GTO 1U and the GTO 1X are generated to provide a period that the gate signals of both the GTO 1U and the GTO 1X are simultaneously OFF, the discharging of the snubber capacitor is conducted to the load and the D-C power source side. Thus, the efficiency of the inverter device is improved.

It is preferred to insert an overvoltage limiting element such as a capacitor (as shown in FIG. 3), a resistor or a constant-voltage diode (not shown) to the primary side or secondary side of the current transformer 8 so as to limit an overvoltage based on the variations in the magnetic flux after the current flowed to the current transformer 8 becomes zero.

Further, the charging energy of the snubber capacitor produced through the current transformer 8 may be returned to other D-C power source.

In the above-described embodiment, a half-bridge has been described. The same effects can also be obtained even if a polyphase inverter construction is employed by connecting a number of the same constructions between the D-C buses.

As the self-extinguishing type switching element, any may be employed if it is a switching element having a self-extinguishing ability such as a transistor.

According to the present invention as described above, the resistors of the snubbers of the positive and negative arm elements are removed, and the capacitor sides of the diodes of the both snubbers are connected through the diode circuits, thereby discharging the charge of the capacitors through the reactors between the positive and negative arm elements. Therefore, the di/dt duty cycle of the GTOs can be reduced as compared with the conventional one. Further, since the resistors are not only removed from the snubber, but also the currents flowed to the diode circuits are converted through the current transformers to the D-C power source side, the power conversion efficiency can be largely increased as compared with the conventional one.

INDUSTRIAL APPLICABILITY

The present invention may be applied to an inverter device as the power conversion device for converting the D-C power into the A-C power.

We claim:

1. A power conversion device for converting D-C input power across a pair of electrodes of a D-C bus into an A-C load power across a pair of reactors, said device comprising:
   self-extinguishing switching elements connected in series across said electrodes;
   corresponding snubbers connected in parallel with said switching elements, each of said snubbers having a capacitor connected to one of said electrodes and a diode in series with said capacitor;
   a capacitor-discharging circuit having a diode and connected across the diodes of said snubbers providing a current path for discharging said snubbers;
   a power source feedback circuit for returning discharging current from said snubbers to said source, said feedback circuit including:
   a diode and a current transformer in said discharge circuit and connected across said electrodes of said bus.

2. A power conversion device according to claim 1 further comprising a first parallel diode connected in anti-parallel to a first series circuit including one of said switching elements and said pair of reactors, and a second parallel diode connected in anti-parallel to a second series circuit including the other of said switching elements and said pair of reactors.

3. A power conversion device according to claim 1 further comprising a first parallel diode connected in anti-parallel to one of said switching elements and a second parallel diode connected in anti-parallel to the other of said switching elements.

4. A power conversion device according to claim 1 further comprising an overvoltage limiting element with one side of the current transformer.

* * * * *